US012744310B2

(12) United States Patent
Anguera et al.

(10) Patent No.: US 12,744,310 B2
(45) Date of Patent: Sep. 22, 2026

(54) DEVICES WITH RADIATING SYSTEMS PROXIMATE TO CONDUCTIVE BODIES

(71) Applicant: IGNION, S.L., Barcelona (ES)

(72) Inventors: Jaume Anguera, Castelló (ES); Aurora Andújar, Barcelona (ES)

(73) Assignee: IGNION, S.L., Barcelona (ES)

( * ) Notice: Subject to any disclaimer, the term of this patent is extended or adjusted under 35 U.S.C. 154(b) by 46 days.

(21) Appl. No.: 18/653,579

(22) Filed: May 2, 2024

(65) Prior Publication Data

US 2024/0356209 A1 Oct. 24, 2024

Related U.S. Application Data

(63) Continuation of application No. 18/446,177, filed on Aug. 8, 2023, now abandoned, which is a
(Continued)

(30) Foreign Application Priority Data

Oct. 30, 2017 (EP) .................................... 17199281

(51) Int. Cl.
*H01Q 1/48* (2006.01)
*H01Q 1/52* (2006.01)
*H01Q 9/04* (2006.01)

(52) U.S. Cl.
CPC ............... *H01Q 1/48* (2013.01); *H01Q 1/528* (2013.01); *H01Q 9/045* (2013.01)

(58) Field of Classification Search
CPC ............ H01Q 1/243; H01Q 1/48; H01Q 1/52; H01Q 9/04
See application file for complete search history.

(56) References Cited

U.S. PATENT DOCUMENTS

| | | | |
|---|---|---|---|
| 5,903,822 | A | 5/1999 | Sekine et al. |
| 6,160,513 | A | 12/2000 | Davidson et al. |

(Continued)

FOREIGN PATENT DOCUMENTS

| | | | |
|---|---|---|---|
| EP | 2731194 A1 | 5/2014 | |
| WO | 02/087012 A1 | 10/2002 | |

(Continued)

OTHER PUBLICATIONS

Best, S.R., Improving the performance properties of a dipole element closely spaced to a PEC ground plane, IEEE Antennas and Wireless Propagation Letters, vol. 3, 2004, pp. 359-363.

(Continued)

*Primary Examiner* — Hasan Islam
(74) *Attorney, Agent, or Firm* — Edell, Shapiro & Finnan, LLC

(57) ABSTRACT

A device includes a radiating system comprising: at least one of a radiation booster or a radiating element; a ground plane layer having at least two connecting points; a radiofrequency system electrically connected to the radiation booster and/or the radiating element and comprising at least one matching network; at least one external port electrically connected to the radiofrequency system; and at least first and second electrically conductive elements each comprising one or more components and being adapted to electrically connect first and second connecting points, respectively, of the at least two connecting points to an electrically conductive body of an apparatus at a distance from the ground plane layer, the distance being less than λ/15, wherein λ is a free-space wavelength at a lowest frequency of operation of the radiating system.

17 Claims, 8 Drawing Sheets

Related U.S. Application Data continuation of application No. 17/994,870, filed on Nov. 28, 2022, now abandoned, which is a continuation of application No. 16/862,064, filed on Apr. 29, 2020, now Pat. No. 11,532,877, which is a continuation of application No. PCT/EP2018/079760, filed on Oct. 30, 2018.

(60) Provisional application No. 62/578,538, filed on Oct. 30, 2017.

(56) References Cited

U.S. PATENT DOCUMENTS

| | | | | |
|---|---|---|---|---|
| 6,285,324 | B1 * | 9/2001 | Korisch | H01Q 1/243 333/26 |
| 6,538,621 | B1 | 3/2003 | Sievenpiper et al. | |
| 6,670,932 | B1 | 12/2003 | Diaz et al. | |
| 6,812,893 | B2 | 11/2004 | Waterman | |
| 6,831,607 | B2 | 12/2004 | Hebron et al. | |
| 6,937,196 | B2 | 8/2005 | Korva | |
| 7,079,079 | B2 | 7/2006 | Jo et al. | |
| 7,319,433 | B2 * | 1/2008 | Rosenberg | H01Q 1/243 343/866 |
| 7,477,200 | B2 | 1/2009 | Parsche | |
| 8,866,693 | B2 | 10/2014 | Nogami | |
| 8,960,560 | B2 | 2/2015 | Hsieh et al. | |
| 9,331,389 | B2 * | 5/2016 | Anguera Pros | H01Q 1/36 |
| 9,825,357 | B2 * | 11/2017 | Parsche | H01Q 9/045 |
| 9,980,018 | B2 * | 5/2018 | Wong | H01Q 5/328 |
| 10,199,730 | B2 | 2/2019 | Anguera Pros et al. | |
| 2003/0146875 | A1 | 8/2003 | Kirino | |
| 2006/0181419 | A1 | 8/2006 | Chen et al. | |
| 2006/0267844 | A1 | 11/2006 | Yanagi et al. | |
| 2008/0316121 | A1 | 12/2008 | Hobson et al. | |
| 2010/0013720 | A1 | 1/2010 | Sakata et al. | |
| 2014/0015728 | A1 | 1/2014 | Anguera Pros et al. | |
| 2016/0111790 | A1 * | 4/2016 | Anguera Pros | H01Q 1/38 343/700 MS |
| 2018/0261912 | A1 | 9/2018 | Mizuno et al. | |

FOREIGN PATENT DOCUMENTS

| | | | |
|---|---|---|---|
| WO | 2004068631 | A2 | 8/2004 |
| WO | 2016012507 | A1 | 1/2016 |
| WO | 2017046972 | A1 | 3/2017 |

OTHER PUBLICATIONS

Polívka, M.; Švanda, M.; Černý, P., Multiple-Arm Folded Monopole Antenna Operating Extremely Close to a Conductive Plane, 14th Conference on Microwave Techniques, Prague, 2008, pp. 1-5.

Mestre, G., Ground Effects over Ground Plane Booster Antenna Technology, Universitat Ramon Llull—La Salle, Barcelona, 2017.

Carr, J.J., Practical Antenna Handbook, 4th edition, New York: McGraw-Hill, 2001, p. 425-426.

Saou-Wen Su and Cheng-Tse Lee, "Metal-Frame GPS Antenna for Smartwatch Applications", Progress In Electromagnetics Research Letters, vol. 62, 2016, pp. 41-47.

* cited by examiner

DEVICES WITH RADIATING SYSTEMS PROXIMATE TO CONDUCTIVE BODIES

CROSS REFERENCE TO RELATED APPLICATIONS

This application is a continuation of U.S. patent application Ser. No. 18/446,177, filed Aug. 8, 2023, which is a continuation of U.S. patent application Ser. No. 17/994,870, filed Nov. 28, 2022, now abandoned, which is a continuation of U.S. patent application Ser. No. 16/862,064, filed on Apr. 29, 2020, now U.S. Pat. No. 11,532,877, which is a continuation of International Application No. PCT/EP2018/079760, filed on Oct. 30, 2018, which claims priority under 35 U.S.C. § 119 to Application No. EP 17199281.1 filed on Oct. 30, 2017, and also claims the benefit of U.S. Provisional Application No. 62/578,538, filed on Oct. 30, 2017, the entire contents of which are hereby incorporated by reference.

TECHNICAL FIELD

The present invention relates to the field of electronic devices. More specifically, the present invention relates to electronic devices with a radiating system adapted to operate while being close to electrically conductive bodies or surfaces.

BACKGROUND

In many applications, electronic devices, such as wireless electronic devices, are not operated in a free-space scenario, but are operated in close proximity to a supporting body. For instance, a wireless router might be placed on a table, and an IoT (Internet of Things) or mobile transceiver might be placed over a conductive body such as a refrigerator, a washing machine, the roof of a car, the bodywork of an airplane, rocket or ship and alike. In the last cases, when the device is close to a conductive body, the efficiency of the radiating system provided by the wireless device decreases dramatically the closer the device is to the electrically conductive body (e.g. Aluminum, Copper, etc.) in terms of the operation wavelength of the radiating system. Not only the efficiency is negatively affected, but also the input impedance changes when such a device is placed close to the conductive body. This is due to the existence of electric currents flowing in the conductive body that, in most cases, are out-of-phase with respect to the electric currents flowing in the ground plane of the device. The effects of close proximity may appear for instance when a distance between the radiating system of the device and the conductive body is smaller than $\lambda/10$, and more significant if the distance is even smaller, such as smaller than $\lambda/15$, smaller than $\lambda/20$, and/or smaller than $\lambda/30$, where $\lambda$ (i.e. lambda) is the operation wavelength of the radiating system. In summary, there are two main negative effects when operating a wireless device close to a conductive body: a low radiation efficiency (e.g. below 30%) and a sever impedance mismatch, resulting in an overall antenna efficiency typically below 20% and/or even below 10%.

Thus, a device including a radiating system capable of operating in close proximity to an electrically conductive body would be an advantageous solution suitable for covering a large range of applications and real market needs.

There are prior-art antenna technologies that are intended to operate in such environments, for example artificial magnetic conductors, meta-surfaces or metamaterials, EBG (electromagnetic band gap) structures and alike. Some of the main disadvantages of these structures are their dimensions and that their particular properties as special structures apply in a narrow band. Other technical solutions for making antennas capable of operating proximate to conductive bodies consist in including a shielding ground plane in the design of the antenna system so that it becomes immune to their effect. These solutions are usually narrow band as well and the performance achieved in terms of efficiency is improvable.

There is an interest in providing devices with a radiating system that are capable of operating close to an electrically conductive body, which attain both good efficiencies and matching performance, and which may cover large bandwidths of operation at one or more frequency regions.

SUMMARY

It is an object of the present invention to provide a device, for instance a wireless device, with a radiating system capable of operating in close proximity to an electrically conductive body such that the radiating system may attain good efficiencies and matching performance.

A first aspect of the invention relates to a device including a radiating system, the radiating system comprising: at least one radiation booster or radiating element; a ground plane layer having at least two connecting points; a radiofrequency system electrically connected to the at least one radiation booster or radiating element and comprising at least one matching network; at least one external port electrically connected to the radiofrequency system; and at least two electrically conductive elements, each of the at least two electrically conductive elements comprising one or more components; first and second electrically conductive elements of the at least two electrically conductive elements being adapted to electrically connect first and second connecting points, respectively, of the at least two connecting points to an electrically conductive body of an apparatus at a distance from the ground plane layer, the distance being smaller than $\lambda/10$, wherein $\lambda$ is a free-space wavelength at a lowest frequency of operation of the radiating system.

The device of the present disclosure may attain better radioelectric performance than devices of the prior art that include at least one radiation booster or radiating element and whose radiating system is proximate to an electrically conductive body of an apparatus, particularly proximate regarding the operating wavelength.

The ground plane layer of the radiating system is provided with a plurality of connecting points (e.g. 2, 3, 4 or more connecting points). Each of these connecting points is in electrical contact with the electrically conductive body of the apparatus by means of one or more components that provide an electrically conductive element.

The at least two electrically conductive elements (e.g. 2, 3, 4 or more electrically conductive elements) are spaced apart and intended to alter the electric currents induced on the surface of the electrically conductive body, thereby altering the electric currents in the ground plane layer. The latter is due to the fact that the proximity between the radiating system and the electrically conductive body in terms of the free-space wavelength of operation results in the coupling of the electric currents in the body to the ground plane layer. Each of the at least two electrically conductive elements may be selected in order to adjust how the electric currents induced on the surface of the body are altered so that at least some of the electric currents flowing therein are in-phase with respect to at least some electric currents induced in the ground plane layer by the at least one radiation booster or radiating element. In this sense, the altered electric currents may partially or completely cancel out part of the electric currents flowing in the electrically conductive body, thereby reducing the amount of electric currents flowing out-of-phase with respect to at least some electric currents induced in the ground plane layer by the at least one radiation booster or radiating element; or, in some cases, a majority of the electric currents in the electrically conductive body are altered so as to be in-phase with respect to at least some electric currents induced in the ground plane layer by the at least one radiation booster or radiating element, thereby improving the radioelectric performance of the device even more. Therefore, the electrical connections are not made for connecting two different ground planes as in prior art devices, but for altering electric currents of the apparatus so as to improve the radioelectric performance of the device when it is proximate thereto.

The at least two connecting points and the connections thereof to the electrically conductive body are, in some embodiments, additionally configured so as to establish different paths for the currents to follow depending on their wavelength or frequency. Accordingly, depending on the paths followed by the currents and the wavelength or frequency thereof, additional bandwidth is provided due to the increased number of currents corresponding to other wavelengths or frequencies flowing in the ground plane layer or the electrically conductive body, thereby improving the electromagnetic radiation capabilities of the device. Therefore, in these cases, if the electromagnetic radiation capabilities of the device in free-space conditions and in close proximity to the electrically conductive body are compared, the latter have a broader bandwidth of operation or additional one or more bands of operation. Such additional configuration and improvement are also possible when the at least two connecting points comprise more than two connecting points, since the provision of more connecting points makes possible to further adjust the number and lengths of the paths followed by the electric currents; for example, in embodiments in which the ground plane layer comprises four or more connecting points (i.e. the at least two connecting points comprise four or more connecting points) there is further flexibility in the configuration of the paths.

In some embodiments, the at least two connecting points comprise at least three connecting points (i.e. at least first, second and third connecting points). In these embodiments, the at least two electrically conductive elements comprise at least three electrically conductive elements (i.e. at least first, second and third electrically conductive elements). Further, first, second and third electrically conductive elements of the at least three electrically conductive elements are adapted to electrically connect the first, the second and the third connecting points, respectively, to the electrically conductive body of the apparatus.

The provision of three or more connecting points may further adjust the alteration of the electric currents in the electrically conductive body, thereby making possible to further improve the radioelectric performance of the device. As the connecting points are spaced apart, the electrically conductive elements connecting them to the body change the electric currents at those locations. Accordingly, the device may be configured with respect to a wider range of types of electrically conductive bodies (in terms of both size and material), a wider range of ground plane layers (in terms of both size and material), and/or a wider range of distances between the radiating system and the electrically conductive body (a shorter or greater distance between the two affects the performance of the radiating system; the distance is always smaller than $\lambda/10$).

In some embodiments, the at least one radiation booster or radiating element comprises a single radiation booster element. In some embodiments, the at least one radiation booster or radiating element comprises two or three radiation booster elements electrically connected.

Both the radiation booster element(s) and the radiating element(s) have their radioelectric performance influenced by a proximate electrically conductive body. However, in some cases the radiation booster element(s) is/are more influenced than the radiating element(s) due to their substantial reliance upon the ground plane layer as the radiation booster element(s) excite radiation modes in the ground plane layer.

Several radiation booster elements may be arranged side-by-side and electrically connected so that the radiation modes are excited differently.

In some embodiments, the at least one radiation booster or radiating element comprises a radiating element.

Radiating elements also have their radioelectric performance improved with a device according to the present disclosure. Radiating elements have a size equal to or greater than $\lambda/15$, wherein $\lambda$ is a free-space wavelength at a frequency of operation of the radiating system. When the radiating element or elements have a size equal to or greater than $\lambda/8$, the radiating element or elements are antennas (e.g. monopoles).

In some embodiments, the radiating system further comprises a feeding system that electrically connects the at least one external port to the radiofrequency system.

The feeding system, which may consist of e.g. a transmission line, a micro coaxial cable, etc. may be provided for improving the radioelectric performance of the radiating system. The at least one external port may be provided at a location of a printed circuit board (on which the radiating system is provided) free from ground plane layer but proximate to it where fewer electric currents or electric currents with lower intensity flow. Such location may be advantageous for the at least one external port because the electronics of any device using the radiating system, e.g. a modem, are less affected by the electric currents and, thus, the overall performance of said device together with the radiating system is improved. The feeding system electrically connects the at least one external port (at the location where it is provided) to the radiofrequency system.

In some embodiments, the first connecting point of the at least two connecting points is at a first half of the ground plane layer in a lengthwise dimension thereof, and the second connecting point of the at least two connecting points is at a second half of the ground plane layer in the lengthwise dimension thereof.

The electric currents are altered in the electrically conductive body based on the location of the connecting points (and also based on the electrically conductive elements making the connection), thus by spacing apart the connecting points by providing the same in the two halves of the ground plane layer along its lengthwise dimension (such that greater separation may be provided) the alteration of electric currents to make them be in-phase with at least some electric currents induced in the ground plane layer by the at least one radiation booster or radiating element may be improved. In some examples, the connecting points are provided proximate to an axis along the lengthwise dimension and passing through a center of the ground plane layer; accordingly, each connecting point is in a different half and substantially at the middle of the ground plane layer in the width dimension thereof. In some of these examples, the connecting points are provided at about the center of each half of the ground plane layer.

In some embodiments, the at least two connecting points comprise at least three connecting points; and the at least two electrically conductive elements comprise at least three electrically conductive elements, a third of the at least two electrically conductive elements being adapted to electrically connect the third connecting point to the electrically conductive body. In some of these embodiments, a first of the at least three connecting points is at a first third of the ground plane layer in a lengthwise dimension thereof, a second of the at least three connecting points is at a second third of the ground plane layer in the lengthwise dimension thereof, and a third of the at least three connecting points is at a third third of the ground plane layer in the lengthwise dimension thereof.

When at least three connecting points are provided, they may be spaced apart by providing each one of them on a different third of the ground plane layer along the lengthwise dimension. In some examples, the connecting points are provided proximate to an axis along the lengthwise dimension and passing through a center of the ground plane layer; accordingly, each connecting point is in a different third and substantially at the middle of the ground plane layer in the width dimension thereof.

In some embodiments, the first connecting point of the at least three connecting points is at a first distance in a width direction of the ground plane layer and at a second distance in the lengthwise dimension of the ground plane layer, the first distance being between ⅓ and ⅔ (the endpoints being included) of a width of the ground plane layer, the second distance being between 0 and ⅙ (the endpoints being included) of a length of the ground plane layer; the second connecting point of the at least three connecting points is at the first distance in the width direction of the ground plane layer and at a third distance in the lengthwise dimension of the ground plane layer, the third distance being between 5⁄12 and 7⁄12 (the endpoints being included) of the length of the ground plane layer; and the third connecting point of the at least three connecting points is at the first distance in the width direction of the ground plane layer and at a fourth distance in the lengthwise dimension of the ground plane layer, the fourth distance being between ⅚ and 6/6 (the endpoints being included) of the length of the ground plane layer.

In this way, two connecting points are close to opposite edges (that extend in a direction corresponding to a width of the ground plane layer) of the ground plane layer, whereas another connecting point is at about the center of the ground plane layer. This distribution of connecting points makes possible to attain a greater cancelling effect of the electric currents induced on the surface of the electrically conductive body.

In some embodiments, the at least two connecting points comprise four or more connecting points (i.e. first, second, third and fourth, and possibly even further connecting points); the at least two electrically conductive elements comprise as many electrically conductive elements (i.e. first, second, third and fourth, and possibly even further electrically conductive elements) as there are connecting points in the at least two connecting points, each electrically conductive element being adapted to electrically connect one of the four or more connecting points to the electrically conductive body.

In some embodiments, the first connecting point of the four or more connecting points is at a first fourth of the ground plane layer in the lengthwise dimension thereof, the second connecting point of the four or more connecting points is at a second fourth of the ground plane layer in the lengthwise dimension thereof, the third connecting point of the four or more connecting points is at a third fourth of the ground plane layer in the lengthwise dimension thereof, and the fourth connecting point of the four or more connecting points is at a fourth fourth of the ground plane layer in the lengthwise dimension thereof.

When at least four connecting points are provided, they may be spaced apart by providing each one of them on a different fourth of the ground plane layer along the lengthwise dimension. In some examples, the connecting points are provided proximate to an axis along the lengthwise dimension and passing through a center of the ground plane layer; accordingly, each connecting point is in a different fourth and substantially at the middle of the ground plane layer in the width dimension thereof.

When the at least two connecting points comprise five or more connecting points, these may be spaced apart by providing each one of them on a different fifth of the ground plane layer along the lengthwise dimension; alternatively, they may be spaced apart but some of them being provided in a same half, third, fourth or fifth of the ground plane layer along the lengthwise dimension, thus two or more connecting points may share such half, third, fourth or fifth.

In some embodiments, each of the at least two electrically conductive elements (e.g. first, second, third, fourth, and/or even further electrically conductive elements) comprises a single component, the component being a via or alike (e.g. screw, electrically conductive foam, electrically conductive plate, etc.).

The connection(s) of the ground plane layer with the electrically conductive body with vias, such as wire-made vias, screws, foams, plates, etc. alters the electric currents of the electrically conductive body (and, thus, in the ground plane layer). The use of such components therefore makes possible to improve the radioelectric performance across a part or the entirety of the bandwidth(s) of operation of the radiating system.

In some embodiments, one, some or all of the at least two electrically conductive elements (e.g. first, second, third, fourth, and/or even further electrically conductive elements) comprises one of: a switch, a capacitor, an inductor, a resistor, a filter (e.g. low pass filter, high pass filter, band pass filter, stop band filter), a via or alike, and a combination thereof; and each of remaining electrically conductive elements of the at least two electrically conductive elements comprises a single component, the component being a via or alike.

The use of electrical components aside from vias or alike makes possible to further adjust how the electric currents are altered in the electrically conductive body (and, thus, in the ground plane layer) in different situations or for different frequencies, hence making possible to selectively adjust the behavior of the electric currents. Accordingly, the radioelectric performance of the radiating system may be improved with different adjustments corresponding to different situations or frequencies. Such electrically conductive elements thus provide additional ways for configuring and optimizing the performance of the radiating system and, therefore, the device when the radiating system is in close proximity to the electrically conductive body.

With the switch, it is possible to selectively connect the connecting point to the electrically conductive body and disconnect the connecting point from the electrically conductive body. To this end, electronics controlling the switch selectively change the configuration of the switch in accordance with a set of conditions or constraints set therein (making or releasing the connection when e.g. a specific bandwidth or wireless communication channel is being operated, a change in the currents flowing is detected with a sensor, etc.).

With inductor(s) and/or capacitor(s), the electrical connection between the connecting point and the electrically conductive body is made through reactive coupling, either inductive coupling or capacitive coupling. For example, the provision of inductor(s) may result in the electrical connection of the corresponding connecting point(s) to the electrically conductive body mostly at lower frequencies, thereby altering the electric currents with said connecting point(s) mostly when the radiating system operates at such lower frequencies; whereas the provision of capacitor(s) may result in the electrical connection of the corresponding connecting point(s) to the electrically conductive body mostly at higher frequencies, thereby altering the electric currents with said connecting point(s) mostly when the radiating system operates at such higher frequencies. Similarly, by providing a filter, the connection between the ground plane layer and the electrically conductive body is made for a range of frequencies, thus e.g. with a low pass filter only electric currents of lower frequencies may use the path with the filter therein, or with a stop band filter only electric currents of determined frequencies may not use the path with the filter therein.

The provision of resistors is advantageous for manually establishing or releasing the connection. By way of example, the resistor may be provided in series with a via or the like and be removed therefrom and soldered back again for changing the establishment of said connection. Preferably the resistors have a resistance as low as possible, including but not limited to 0 ohms resistors and the like.

It is possible to provide a plurality of the aforementioned components in one electrically conductive element so as to combine the effects thereof without departing from the scope of the present disclosure; by way of example, an inductor may be provided together with a switch, or a filter be provided together with a via or the like.

In those embodiments in which the at least two electrically conductive elements comprise two electrically conductive elements, one or both of them may include one or more components in the form of a switch, a capacitor, an inductor, a resistor, a filter, a via or the like, or a combination thereof. In those embodiments in which the at least two electrically conductive elements comprise three electrically conductive elements, one, two or all three of them may include one or more of the aforementioned components. In those embodiments in which the at least two electrically conductive elements comprise four or more electrically conductive elements, one, several (e.g. two, three, etc.) or all of them may include one or more of the aforementioned electrical components.

In some embodiments, the distance is smaller than λ/15. In some of these embodiments, the distance is smaller than λ/20. In some of these embodiments, the distance is smaller than λ/30.

The distance between the ground plane layer of the device and the electrically conductive (and, thus, the distance between the device and the apparatus) is made smaller in order to reduce the space and volume needed by both. However, the electric currents flowing in the latter are coupled to the former with a greater intensity, thereby decreasing the radioelectric performance of the radiating system. A device according to the present disclosure may provide an enhanced radioelectric performance with respect to devices of the prior art even if the distance is as small as aforementioned. In some cases, the distance is at least equal to or greater than λ/100, for example equal to or greater than λ/50.

In some embodiments, a lowest frequency of operation of the radiating system is equal to or greater than 50 MHz and is less than 100 GHz.

In some embodiments, the radiating system at least operates or further operates from 824 MHz to 960 MHz.

The radiating system at least transmits and/or receives electromagnetic wave signals in a frequency band ranging from 824 MHz to 960 MHz, which is used for cellular communications. As it is known by the skilled person, the influence of the electrically conductive body on the radiating system depends upon the frequencies of operation of the radiating system.

In some embodiments, the radiating system at least operates or further operates from 698 MHz to 960 MHz.

In some embodiments, the radiating system at least operates or further operates from 1710 MHz to 2690 MHz.

The radiating system further transmits and/or receives electromagnetic wave signals, or at least transmits and/or receives electromagnetic wave signals, in a frequency band ranging from 1710 MHz to 2690 MHz, which is used for cellular communications.

In some embodiments, the device is a wireless device. In some of these embodiments, the wireless device is a portable wireless device.

In some embodiments, a width of the electrically conductive body is greater than a width of the ground plane layer, and a length of the electrically conductive body is greater than a length of the ground plane layer. In some of these embodiments, the width of the electrically conductive body is smaller than 100 times the width of the ground plane layer, and the length of the electrically conductive body is smaller than 100 times the length of the ground plane layer. In some of these embodiments, the width of the electrically conductive body is smaller than any one of the following: 50 times, 25 times, 10 times, 5 times and 2 times the width of the ground plane layer; and the length of the electrically conductive body is smaller than any one of the following: 50 times, 25 times, 10 times, 5 times and 2 times the length of the ground plane layer.

As the surface of the electrically conductive body is comparable or larger than the ground plane layer, the performance of the radiating system worsens owing to the coupling of electric currents induced on the surface of the body.

A second aspect of the invention relates to a system comprising: a device according to the first aspect of the invention; and an apparatus comprising an electrically conductive body.

In some embodiments, a width of the electrically conductive body is greater than a width of the ground plane layer, and a length of the electrically conductive body is greater than a length of the ground plane layer. In some of these embodiments, the width of the electrically conductive body is smaller than 100 times the width of the ground plane layer, and the length of the electrically conductive body is smaller than 100 times the length of the ground plane layer. In some of these embodiments, the width of the electrically conductive body is smaller than any one of the following: 50 times, 25 times, 10 times, 5 times and 2 times the width of the ground plane layer; and the length of the electrically conductive body is smaller than any one of the following: 50 times, 25 times, 10 times, 5 times and 2 times the length of the ground plane layer.

In some embodiments, the apparatus is one of: a smart TV, a refrigerator, a fridge, a washing machine, a drying machine, a gas-meter, a water-meter, an electricity-meter, a motor vehicle, a train, an airplane, a rocket, and a ship.

The electrically conductive body is e.g. a plate of any one of the TV, the refrigerator, the washing machine, the drying machine, the gas-meter, the water-meter, the electricity-meter, a roof or a bodywork of any one of the motor vehicle, the train, the airplane, the rocket, the ship, etc. In many embodiments, the electrically conductive body is provided as a shielding or a ground plane, and in some embodiments the electrically conductive body is at least one ground plane layer of a printed circuit board within the apparatus.

Similar advantages as those described for the first aspect of the invention are also applicable to this aspect of the invention.

A third aspect of the invention relates to a method comprising: providing a device including a radiating system, the radiating system comprising: at least one radiation booster or radiating element; a ground plane layer; a radiofrequency system electrically connected to the at least one radiation booster or radiating element and comprising at least one matching network; and at least one external port electrically connected to the radiofrequency system; providing the ground plane layer with at least two connecting points; providing an apparatus, the apparatus comprising an electrically conductive body; providing at least two electrically conductive elements, each of the at least two electrically conductive elements comprising one or more components; and connecting a first of the at least two connecting points to the electrically conductive body with a first of the at least two electrically conductive elements, and a second of the at least two connecting points to the electrically conductive body with a second of the at least two electrically conductive elements; the device being provided such that the ground plane layer is at a distance from the electrically conductive body, the distance being smaller than $\lambda/10$, wherein $\lambda$ is a free-space wavelength at a lowest frequency of operation of the radiating system.

The method makes possible to provide the device in close proximity to the apparatus yet reduce the decrease in radioelectric performance of the device due to the coupling of electric currents induced on the surface of the electrically conductive body to the radiating system.

The provision of both the at least two connecting points (e.g. 2, 3, 4 or more connecting points) and the at least two electrically conductive elements (e.g. 2, 3, 4 or more electrically conductive elements), and the use of the latter to connect the ground plane layer to the electrically conductive body makes possible to alter at least some electric currents on the surface of the electrically conductive body such that they are in-phase with respect to at least some electric currents induced in the ground plane layer by the at least one radiation booster or radiating element. As the electric currents are coupled from the electrically conductive body to the ground plane layer, the electric currents as altered are coupled.

In some embodiments, the step of providing the ground plane layer with at least two connecting points comprises providing the ground plane layer with: the first of the at least two connecting points at a first half of the ground plane layer in a lengthwise dimension thereof; and the second of the at least two connecting points at a second half of the ground plane layer in the lengthwise dimension thereof.

In some embodiments, the at least two connecting points comprise at least three connecting points. In these embodiments, the at least two electrically conductive elements comprise at least three electrically conductive elements; and the method further comprises connecting the first of the at least three connecting points to the electrically conductive body with the first of the at least three electrically conductive elements, the second of the at least three connecting points to the electrically conductive body with the second of the at least three electrically conductive elements, and a third of the at least three connecting points to the electrically conductive body with a third of the at least three electrically conductive elements.

In some embodiments, the first connecting point of the at least three connecting points is at a first third of the ground plane layer in a lengthwise dimension thereof, the second connecting point of the at least three connecting points is at a second third of the ground plane layer in the lengthwise dimension thereof, and the third connecting point of the at least three connecting points is at a third third of the ground plane layer in the lengthwise dimension thereof.

In some embodiments, the first connecting point of the at least three connecting points is at a first distance in a width direction of the ground plane layer and at a second distance in the lengthwise dimension of the ground plane layer, the first distance being between $1/3$ and $2/3$ (the endpoints being included) of a width of the ground plane layer, the second distance being between 0 and $1/6$ (the endpoints being included) of a length of the ground plane layer; the second connecting point of the at least three connecting points is at the first distance in the width direction of the ground plane layer and at a third distance in the lengthwise dimension of the ground plane layer, the third distance being between $5/12$ and $7/12$ (the endpoints being included) of the length of the ground plane layer; and the third connecting point of the at least three connecting points is at the first distance in the width direction of the ground plane layer and at a fourth distance in the lengthwise dimension of the ground plane layer, the fourth distance being between $5/6$ and 6/6 (the endpoints being included) of the length of the ground plane layer.

In some embodiments, the at least two connecting points comprise four or more connecting points (i.e. first, second, third and fourth, and possibly even further connecting points); the at least two electrically conductive elements comprise as many electrically conductive elements (i.e. first, second, third and fourth, and possibly even further electrically conductive elements) as there are connecting points in the at least two connecting points; and the step of connecting the ground plane layer to the electrically conductive body with the at least two electrically conductive elements further comprises: connecting each connecting point of the at least two connecting points to the electrically conductive body with one of the at least two electrically conductive elements.

In some embodiments, the at least one radiation booster or radiating element comprises a single radiation booster element. In some embodiments, the at least one radiation booster or radiating element comprises two or three radiation booster elements electrically connected.

In some embodiments, the at least one radiation booster or radiating element comprises a radiating element.

In some embodiments, the radiating system further comprises a feeding system that electrically connects the at least one external port to the radiofrequency system. In these embodiments, the at least one external port is provided in a part of the device (in a printed circuit board thereof on which the radiating system is allocated) free from ground plane layer but proximate to it where fewer electric currents or electric currents with lower intensity flow.

In some embodiments, each of the at least two electrically conductive elements comprises a single component, the component being a via or alike.

In some embodiments, one, some or all of the at least two electrically conductive elements (e.g. first, second, third, fourth, and/or even further electrically conductive elements) comprises one of: a switch, a capacitor, an inductor, a resistor, a filter (e.g. low pass filter, high pass filter, band pass filter, stop band filter), a via or alike, and a combination thereof; and each of remaining electrically conductive elements of the at least two electrically conductive elements comprises a single component, the component being a via or alike.

In some embodiments, the distance is smaller than λ/15. In some of these embodiments, the distance is smaller than λ/20. In some of these embodiments, the distance is smaller than λ/30. In some cases, the distance is at least equal to or greater than λ/100, for example equal to or greater than λ/50.

In some embodiments, a lowest frequency of operation of the radiating system is equal to or greater than 50 MHz and is less than 100 GHz.

In some embodiments, the method further comprises providing the at least one matching network so that the radiating system at least operates or further operates from 824 MHz to 960 MHz.

In some embodiments, the method further comprises providing the at least one matching network so that the radiating system at least operates or further operates from 698 MHz to 960 MHz.

In some embodiments, the method further comprises providing the at least one matching network so that the radiating system at least operates or further operates from 1710 MHz to 2690 MHz.

In some embodiments, the device is a wireless device. In some of these embodiments, the wireless device is a portable wireless device.

In some embodiments, a width of the electrically conductive body is greater than a width of the ground plane layer, and a length of the electrically conductive body is greater than a length of the ground plane layer. In some of these embodiments, the width of the electrically conductive body is smaller than 100 times the width of the ground plane layer, and the length of the electrically conductive body is smaller than 100 times the length of the ground plane layer. In some of these embodiments, the width of the electrically conductive body is smaller than any one of the following: 50 times, 25 times, 10 times, 5 times and 2 times the width of the ground plane layer; and the length of the electrically conductive body is smaller than any one of the following: 50 times, 25 times, 10 times, 5 times and 2 times the length of the ground plane layer.

In some embodiments, the apparatus is one of: a smart TV, a refrigerator, a fridge, a washing machine, a drying machine, a gas-meter, a water-meter, an electricity-meter, a motor vehicle, a train, an airplane, a rocket, and a ship.

Similar advantages as those described for the first aspect of the invention are also applicable to this aspect of the invention.

BRIEF DESCRIPTION OF THE DRAWINGS

The mentioned and further features and advantages of the invention become apparent in view of the detailed description which follows with some examples of the invention, referenced by means of the accompanying drawings, given for purposes of illustration only and in no way meant as a definition of the limits of the invention.

DETAILED DESCRIPTION

Figure 1A:
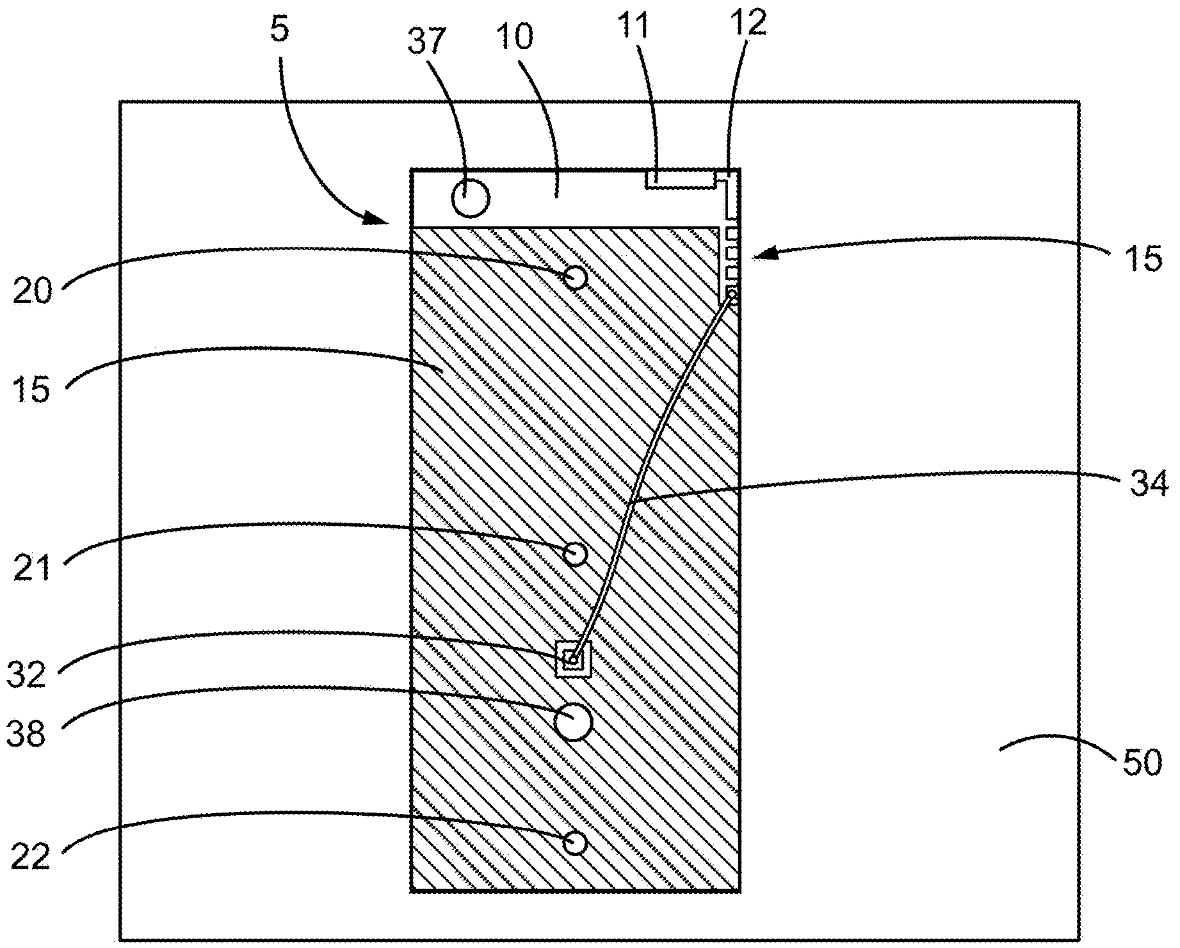
FIGS. 1A-1B show, from two different views, a radiating system of a device in accordance with an embodiment FIGS. 2-6 diagrammatically show portions of ground plane layers where connecting points may be provided in accordance with embodiments.
Figure 1B:
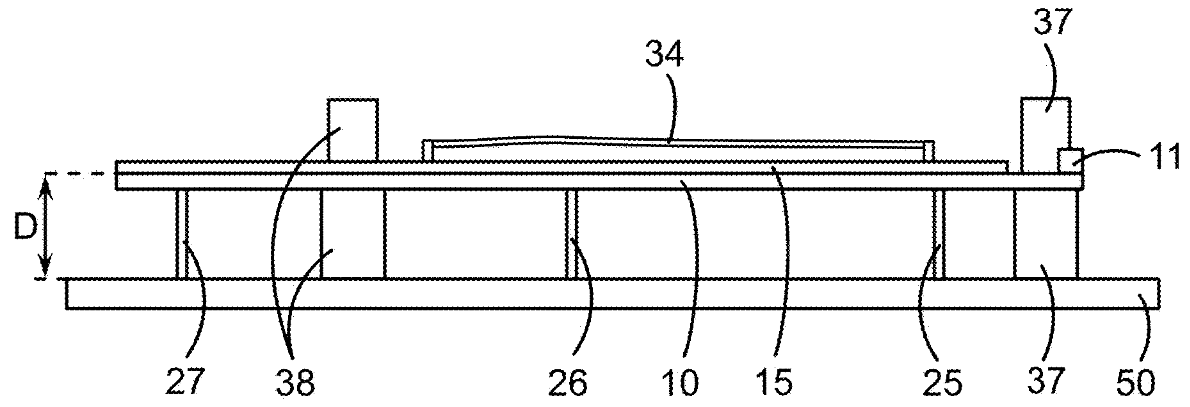

FIGS. 1A-1B show a device 5 in accordance with an embodiment of the invention; FIG. 1A shows the device 5 from a top view whereas FIG. 1B shows the device 5 from a side view.

The device 5 includes a radiating system that comprises a printed circuit board 10, i.e. PCB, with a ground plane layer 15 (shown with a striped pattern for illustrative purposes only). The ground plane layer 15 may be on one side of the printed circuit board 10 only or on both sides of the printed circuit board 10, and in some cases even have one or more ground plane layers within the printed circuit board 10; in any of these cases, the different ground plane layers provided in the PCB 10 are connected one to each other by means of via holes. The device 5 further comprises at least one radiation booster or radiating element 11. In this example, the device 5 comprises a single radiation booster element 11 mounted on the PCB 10, particularly in a portion thereof free from ground plane layer 15, and features dimensions of 12.0 mm×3.0 mm×2.4 mm.

Figure 8:
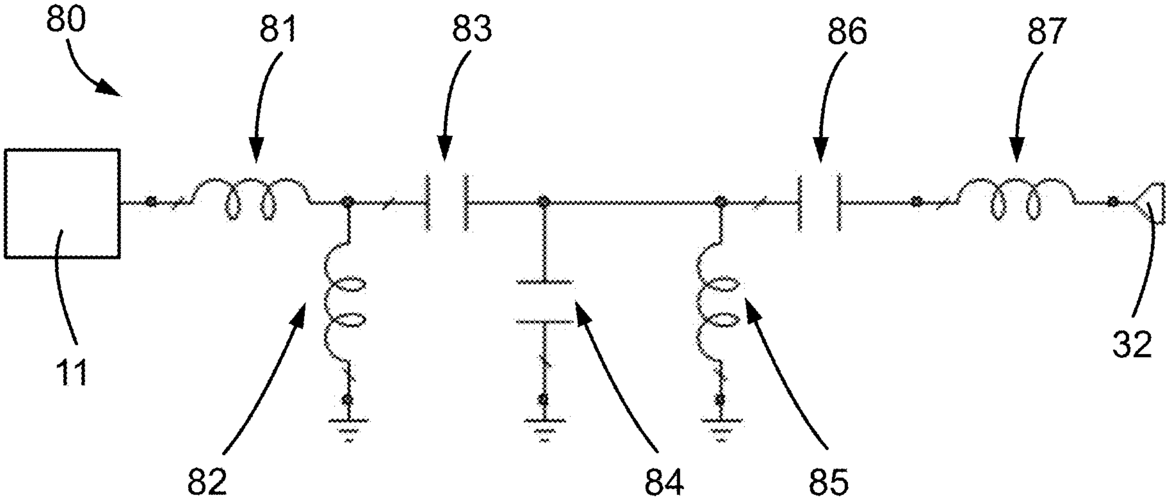
FIG. 8 shows an exemplary matching network.

The radiation booster element 11 excites radiation modes in the ground plane layer 15. Since the radiation booster element 11 is mainly reactive across the frequencies of operation, it is mismatched to an impedance of e.g. a signal transmitter or receiver, a modem or the like for effecting communications by means of the radiating system, which is usually 50 ohms. The device 5 further comprises a radiofrequency system, which comprises a matching network 30 (in FIG. 1A only several pads are shown where components of the matching network are installed for the sake of clarity only) for matching purposes. The radiofrequency system is electrically connected to both the radiation booster element 11 (by means of a feeding line 12, that is, for example a metallic strip or a conductive trace) and at least one external port 32. In this example, the matching network 30 comprises seven electrical components and is illustrated in FIG. 8. Said radiation booster element 11, in combination with said radiofrequency system and the ground plane layer 15, enables the operation of the radiating system in two frequency bands: from 824 MHz to 960 MHz, and from 1710 MHz to 2690 MHz.

The device 5 may also comprise a feeding system 34 that connects the radiofrequency system to the at least one external port 32, such as in this example, but in other embodiments the radiofrequency system is electrically connected to the at least one external port 32 without a feeding system 34, for example with a direct electrical connection from an end terminal of the at least one matching network 30 to the at least one external port 32.

Beneath the device 5 is an apparatus having an electrically conductive body 50. Such electrically conductive body 50, when it is proximate to the radiating system of the device 5, influences the capability of the radiating system of radiating and/or capturing electromagnetic waves. The electrically conductive body 50 has electric currents flowing therein that are coupled to the ground plane layer 15 of the radiating system when the distance between the two is small. Normally, an average distance between the electrically conductive body 50 and the ground plane layer 15 must be small, meaning that the two are substantially parallel and one above or below the other so that there is at least some superposition between the two, as in FIGS. 1A-1B where there is complete superposition: beneath the entire ground plane layer 15 is the electrically conductive body 50. The distance is small when it is less than λ/10; by way of example the distance may also be smaller than any one of the following values: λ/15, λ/20 and λ/30; wherein λ is a free-space wavelength at a lowest frequency of operation of the radiating system.

The device 5 is provided with two nylon spacers 37, 38 that maintain the device 5 attached to the electrically conductive body 50 such that there is the distance D (shown in FIG. 1B) between the two. The electric currents that are coupled from the electrically conductive body 50 to the ground plane layer 15 worsen the performance of the radiating system by decreasing the efficiency thereof and increasing the impedance mismatch thereof.

In this example, the distance D is set to 10 mm. The radiating system of the device 5 operates from 824 MHz to 960 MHz and from 1710 MHz to 2690 MHz, and thus the distance D is less than λ/10 and even less than λ/30 for the free-space wavelength at 824 MHz.

A plurality of connecting points, in this example three connecting points 20-22, is provided in the ground plane layer 15. A plurality of electrically conductive elements, in this example three electrically conductive elements 25-27 that comprise vias in the form of wire-made vias, is provided between the ground plane layer 15 and the electrically conductive body 50 such that a plurality of electrical connections is made between the two. The vias have a length equal to the distance D and a diameter of 1 mm.

The electrically conductive elements 25-27 alter the electric currents induced on the surface of the electrically conductive body 50, which are coupled to the ground plane layer 15. The electric currents are preferably altered so that at least some electric currents in the electrically conductive body 50 are in-phase with at least some electric currents induced in the ground plane layer 15 owing to the excitation of radiating modes by the radiation booster element 11. As the electric currents flowing in the electrically conductive body 50 are coupled to the ground plane layer 50, the altered electric currents are also coupled thereto, thereby improving the operation of the radiating system.

In some examples, one or more of the electrically conductive elements 25-27 comprise different components and/or even two or more components; for example, switches, inductors, capacitors, filters, etc. The provision of such electrically conductive elements makes possible to further improve the operation of the radiating system by adjusting how the electric currents flowing in the electrically conductive body 50 are altered. Accordingly, by providing switches, inductors, capacitors, filters, etc. it is possible to adjust when the electric currents are altered and for which frequencies the electric currents are altered.

The device 5 is an electronic device such as e.g. a mobile phone, a smartphone, a router, a communications module, a transceiver, a laptop computer, a tablet, a GPS system, a sensor, or generally a multifunction wireless device which combines the functionality of multiple devices).

The radiation booster element 11 may be a radiation booster as described in patent document WO-2016012507-A1, which is hereby incorporated by reference in its entirety. For instance, as described in lines 25-33 of page 9 and lines 1-10 of page 10 of said patent document, the radiation booster element 11 includes a dielectric material and in some embodiments, a single standard layer of dielectric material spacing two or more conductive elements. A single standard layer of dielectric material refers to dielectric material with a standard thickness, which is available off-the-shelf. For example, 0.025" (0.635 mm), 0.047" (1.2 mm), 0.093" (2.36 mm) or 0.125" (3.175 mm) are common/standard thicknesses for dielectric materials which are available in the market. Examples of dielectric materials include fiber-glass FR4, Cuclad, Alumina, Kapton, Ceramic and for instance commercial laminates and substrates from Rogers® Corporation (RO3000® and RO4000® laminates, Duroid substrates and alike) or other suitable non-conductive materials. The radiation booster element 11 may be formed by printing or depositing conductive material in a first and a second surface of the dielectric material (e.g. top and bottom) and adding several vias to electrically connect the conductive material in the first surface with the conductive material in the second surface. The conductive material in the first and second surfaces may have a substantially polygonal shape. Some possible polygonal shapes are for instance, but not limited to, squares, rectangles, and trapezoids. When the conductive material in said first and second surfaces has an elongated shape, for instance a rectangular shape, the radiation booster element takes the form of a booster bar; a booster bar may also include vias that electrically connect the conductive material in the first surface with the conductive material in the second surface.

In some embodiments, the radiation booster element 11 has a size as described in lines 24-34 of page 12, lines 1-34 of page 13, and lines 1-6 of page 14 of said patent document, thus the maximum size is at least smaller than 1/15 of the free-space wavelength corresponding to the lowest frequency of operation. In some cases, said maximum size may also be smaller than any one of the following values: 1/20, 1/25, 1/30, 1/50, and/or 1/100 of the free-space wavelength corresponding to the lowest frequency of operation. Additionally, in some of these examples the radiation booster element 11 has a maximum size larger than any one of the following values: 1/1400, 1/700, 1/350, 1/250, 1/180, 1/140, and/or 1/120 times the free-space wavelength corresponding to the lowest frequency of operation. The maximum size of the radiation booster element 11 is preferably defined by the largest dimension of a booster box that completely encloses said radiation booster element 11, and in which the radiation booster element 11 is inscribed. More specifically, a booster box for a radiation booster element 11 is defined as being the minimum-sized parallelepiped of square or rectangular faces that completely encloses the radiation booster element 11 and wherein each one of the faces of said minimum-sized parallelepiped is tangent to at least a point of said radiation booster element 11. Moreover, each possible pair of faces of said minimum-size parallelepiped sharing an edge forms an inner angle of 90°.

Different matching networks 30 are possible within the scope of the present disclosure, for example but not limited to, those described in patent document WO-2016012507-A1.

Figure 2:
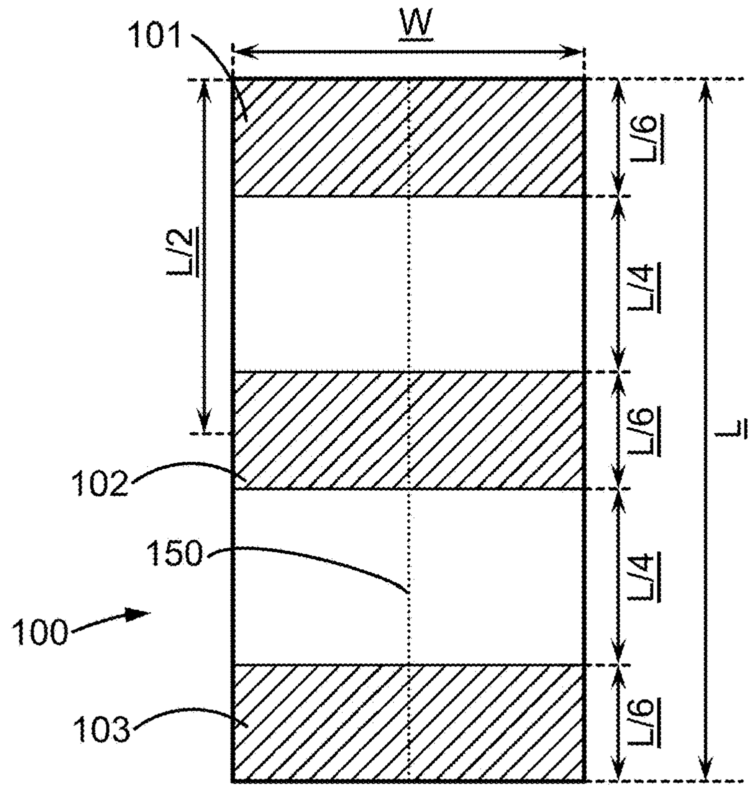
Figure 3:
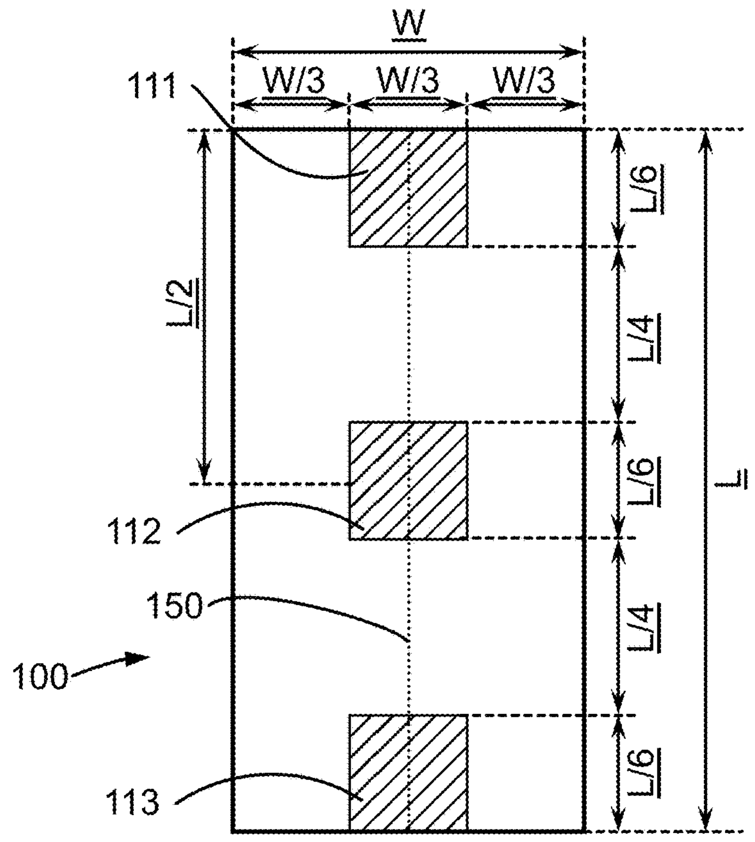
Figure 4:
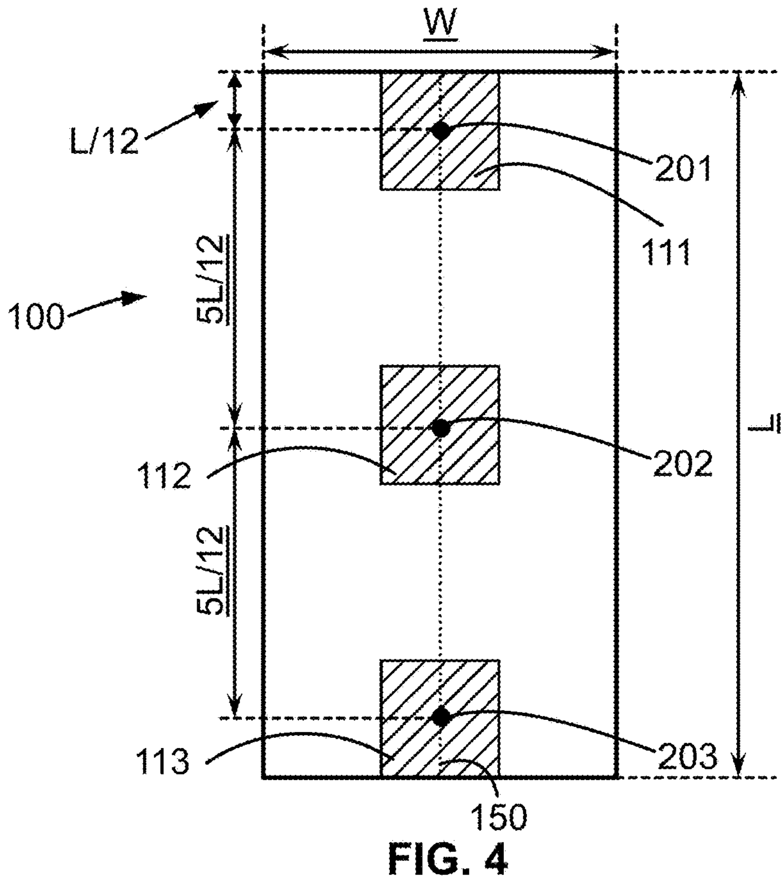

FIGS. 2-4 diagrammatically show portions of a ground plane layer 100 where connecting points may be provided in accordance with embodiments. The ground plane layer 100 of a device is provided on a PCB thereof and has a rectangular shape. The ground plane layer 100 has a lengthwise dimension defining a length L, and a width dimension defining a width W. By way of example, the length L is 120 mm and the width W is 60 mm, but other lengths and widths are also possible within the scope of the present disclosure.

In FIG. 2, the ground plane layer 100 has first, second and third portions 101-103 (shown with a striped pattern for illustrative purposes only, but it is readily apparent that they are part of the ground plane layer 100) in which connecting points may be provided.

The first portion 101 is at a first end of the ground plane layer 100, and coincides with a first edge thereof that extends in a direction corresponding to the width dimension; the first portion 101 extends a length L/6 along the lengthwise dimension of the ground plane layer 100 and has a width W. The second portion 102 is at a central part (at a length of L/2) of the ground plane layer 100 and extends a length L/6 along the lengthwise dimension of the ground plane layer 100 and has a width W. The third portion 103 is at a second end of the ground plane layer 100, and coincides with a second edge thereof that extends in a direction corresponding to the width dimension; the third portion 101 extends a length L/6 along the lengthwise dimension of the ground plane layer 100 and has a width W.

Each of the connecting points (not illustrated) may be provided in any part of one of the three portions 101-103 so that the connecting points are spaced apart one relative to each other. In some examples, the connecting points are each provided in one of the three portions 101-103 such that they are on or proximate to a central axis 150 (shown with a dashed line for illustrative purposes only) of the ground plane layer 100, which goes along the lengthwise dimension thereof.

In FIG. 3, the ground plane layer 100 has first, second and third portions 111-113 (shown with a striped pattern for illustrative purposes only, but it is readily apparent that they are part of the ground plane layer 100) in which connecting points may be provided.

Each of the first, the second and the third portions 111-113 extend a same length as the three portions 101-103 of FIG. 2, but the width thereof is different. The first, the second and the third portions 111-113 have a width W/3 (which in this example coincides with L/6 owing to the dimensions of the ground plane layer 100). In this example, half of the width thereof extends from one side of the central axis 150 and the other half of the width thereof extends from the other side of the central axis 150. In some examples, the width of the first, the second and the third portions 111-113 is between 0.05λ and 0.06λ, and in some examples between 0.0535λ and 0.0545λ, where λ is a free-space wavelength corresponding to a lowest frequency of operation of the radiating system.

In FIG. 4, the same portions 111-113 of the example of FIG. 3 are shown, but also illustrated herein are first, second and third connecting points 201-203. The connecting points 201-203 are provided at the center of the portions 111-113 such that they coincide with the central axis 150. The distances between the first and the second connecting points 201-202, and between the second and the third connecting points 202-203 are the same, which is 5 L/12. In some examples, the distance between the first and the second connecting points 201-202 and the distance between the second and the third connecting points 202-203 are between 0.1λ and 0.4λ, for example between 0.11λ and 0.324λ, and in some examples between 0.135λ and 0.145λ along the central axis 150.

Figure 5:
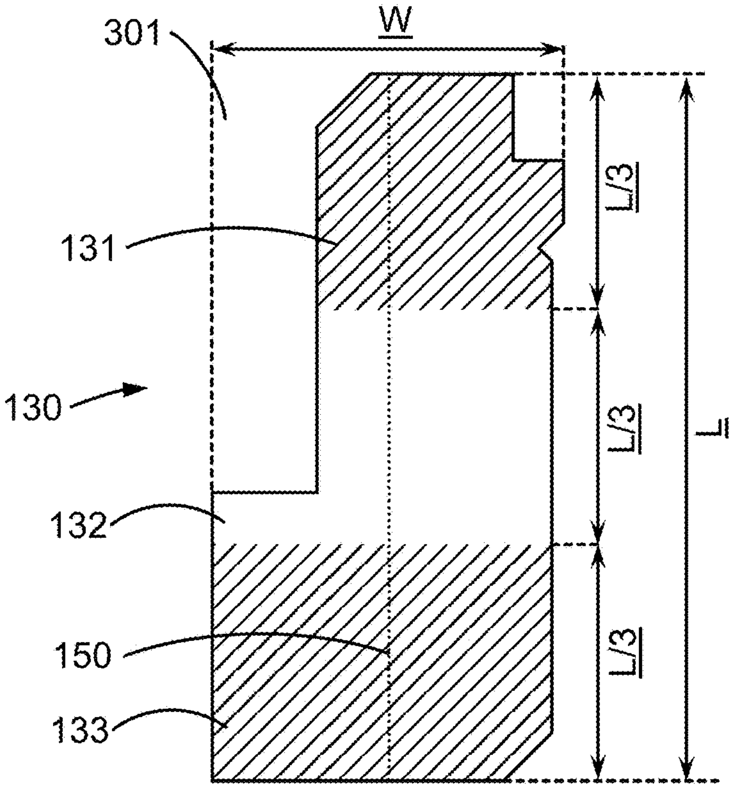

FIG. 5 diagrammatically shows portions of a ground plane layer 130 where connecting points may be provided in accordance with embodiments. The ground plane layer 130 of a device is provided on a PCB thereof and has an irregular shape. The ground plane layer 130 has a lengthwise dimension defining a length L, and a width dimension defining a width W. By way of example, the length L is 110 mm and the width W is 55 mm, but other lengths and widths are also possible within the scope of the present disclosure.

The ground plane layer 130 has first, second and third portions 131-133 (the first and the third portions 131, 133 are shown with a striped pattern for illustrative purposes only, but it is readily apparent that they are part of the ground plane layer 130) in which connecting points may be provided.

Each of the three portions 131-133 corresponds to a third of the ground plane layer 130 along the lengthwise dimension thereof, thus each portion 131-133 has a length of L/3. The first portion 131 is at a first end of the ground plane layer 130, and coincides with a first edge thereof that extends in a direction corresponding to the width dimension; the first portion 131 has a width that is less than W. The second portion 132 is at a center of the ground plane layer 130 and has a width that is less than W, but is greater than the width of the first portion 131. The third portion 133 is at a second end of the ground plane layer 130, and coincides with a second edge thereof that extends in a direction corresponding to the width dimension; the third portion 133 has a same width as the second portion 132.

Each of the connecting points (not illustrated) may be provided in any part of one of the three portions 131-133 such that they are spaced apart one relative to each other. In some examples, the connecting points are each provided in one of the three portions 131-133 such that they are on or proximate to the central axis 150 of the ground plane layer 130.

Figure 6:
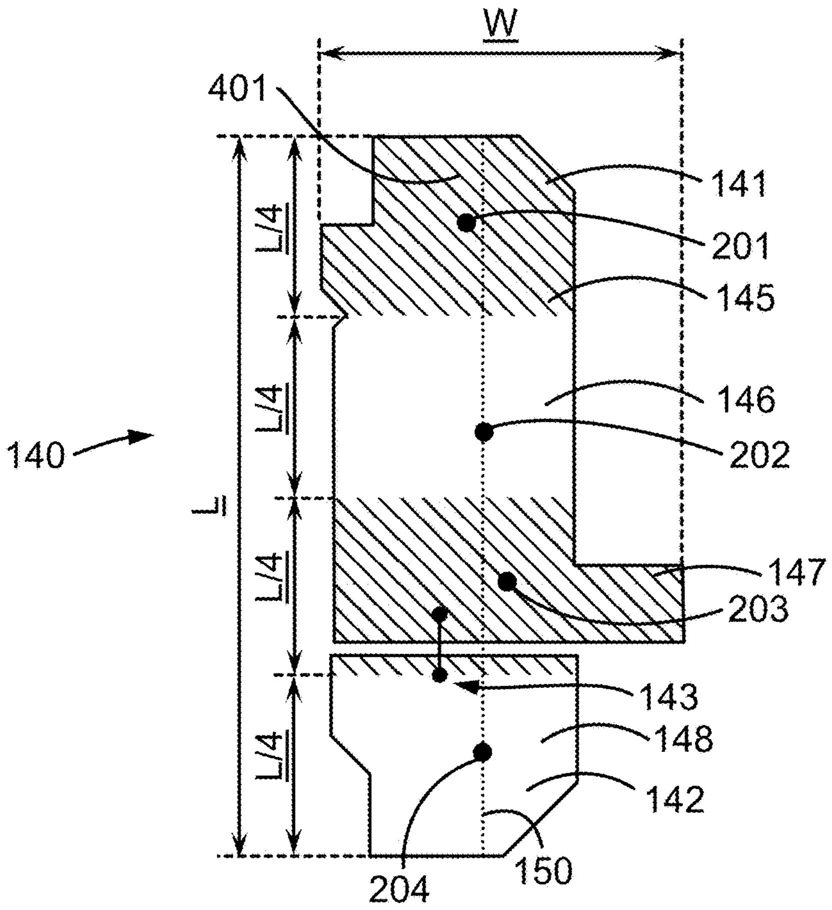

FIG. 6 diagrammatically shows portions of a ground plane layer 140 where connecting points may be provided in accordance with embodiments.

The ground plane layer 140 of a device comprises first and second ground plane layers 141, 142 that are provided on a same PCB of the device or on different PCBs of the device. The first and the second ground plane layers 141, 142 have an irregular shape and are electrically connected with at least one electrically conductive element 143. The ground plane layer 140 has a lengthwise dimension defining a length L, and a width dimension defining a width W when both the first and the second ground plane layers 141, 142 are fixedly attached to the device. The placement of the ground plane layers 141, 142 inside the device is important for the location of the connecting points because it establishes the location where the electric currents will be altered on the surface of an electrically conductive body of an apparatus. By way of example, the length L is 100 mm and the width W is 50 mm, but other lengths and widths are also possible within the scope of the present disclosure.

The ground plane layer 140 has first, second, third and fourth portions 145-148 (the first and the third portions 145, 147 are shown with a striped pattern for illustrative purposes only, but it is readily apparent that they are part of the ground plane layer 140) in which connecting points may be provided. In this example, the first and the second portions 145, 146 are in the first ground plane layer 141, a first part of the third portion 147 is in the first ground plane layer 141 and a second part of the third portion 147 is in the second ground plane layer 142, and the fourth portion 148 is in the second ground plane layer 142.

Each of the four portions 145-148 corresponds to a fourth of the ground plane layer 140 along the lengthwise dimension thereof, thus each portion 145-148 has a length of L/4. The first portion 145 is at a first end of the ground plane layer 140, and coincides with a first edge thereof that extends in a direction corresponding to the width dimension; the first portion 145 has a width that is less than W. The second portion 146 is between the first portion 145 and the third portion 147 (i.e. it extends between L/4 and L/2 of the lengthwise dimension of the ground plane layer 140) and has a width that is less than the width of the first portion 145. The third portion 147 is at a part of the first ground plane layer 141 having a second end thereof and also at a part of the second ground plane layer 142 having a first end thereof; the third portion 147 has a width that is less than W but greater than the widths of the first and the second portions 145, 146. The fourth portion 148 is at a part of the second ground plane layer 142 having a second end thereof and coincides with a second edge of the ground plane layer 140 that extends in a direction corresponding to the width dimension; the fourth portion 148 has a width that is less than W.

The connecting points 201-204 are in one of the four portions 145-148 such that they are spaced apart one relative to each other. In this example, the connecting points 201-204 are on or proximate to the central axis 150 of the ground plane layer 140. In some other embodiments, several connecting points are arranged on a same portion of the four portions 145-148, for example when six connecting points are provided, two may be in the first portion 145, two other points in the second portion 146, one other point in the third portion 147 and a last point in the fourth portion 148. Different combinations are possible within the scope of the present disclosure.

Figure 7A:
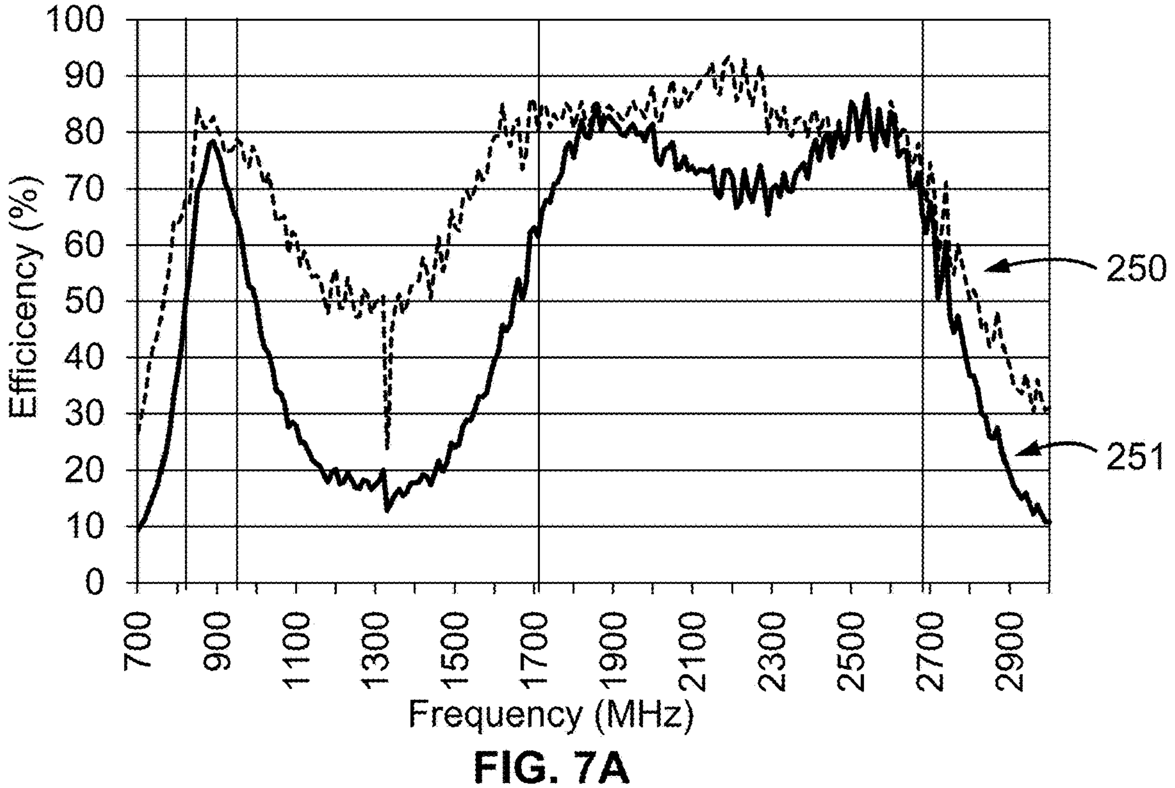
FIGS. 7A-7C show different graphs in which radiation and antenna efficiencies of a device in free-space conditions, a device in close proximity to an electrically conductive body and a device in accordance with an embodiment are compared.
Figure 7B:
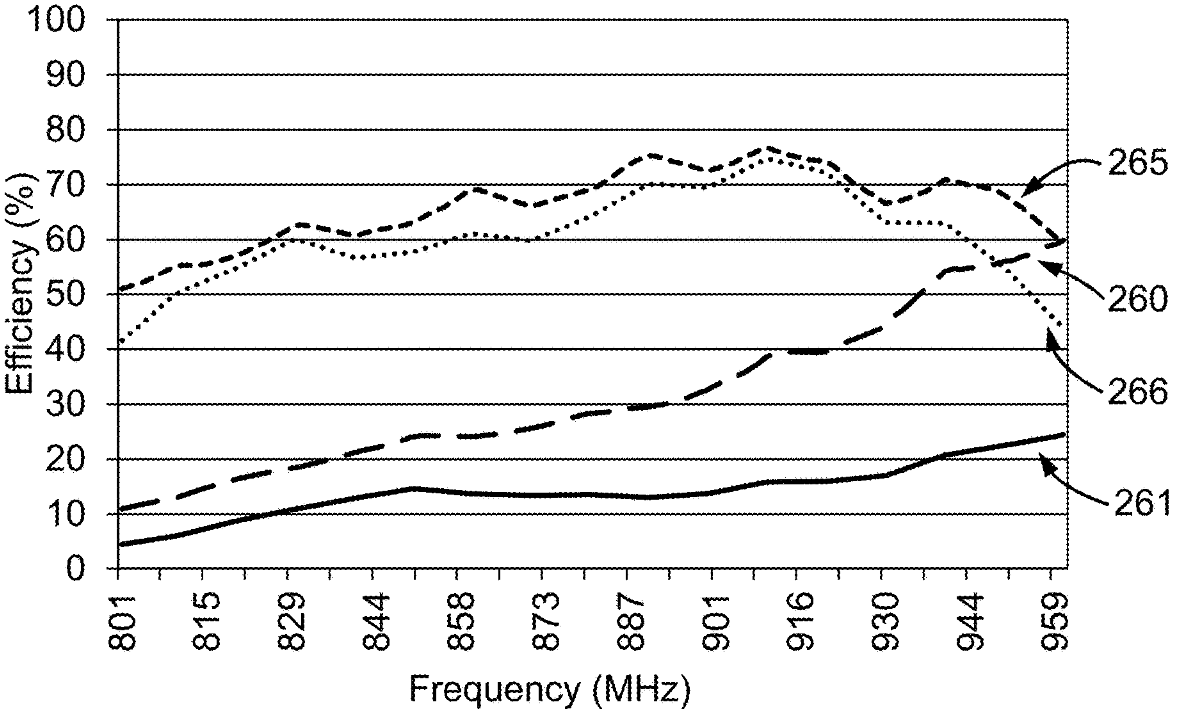
Figure 7C:
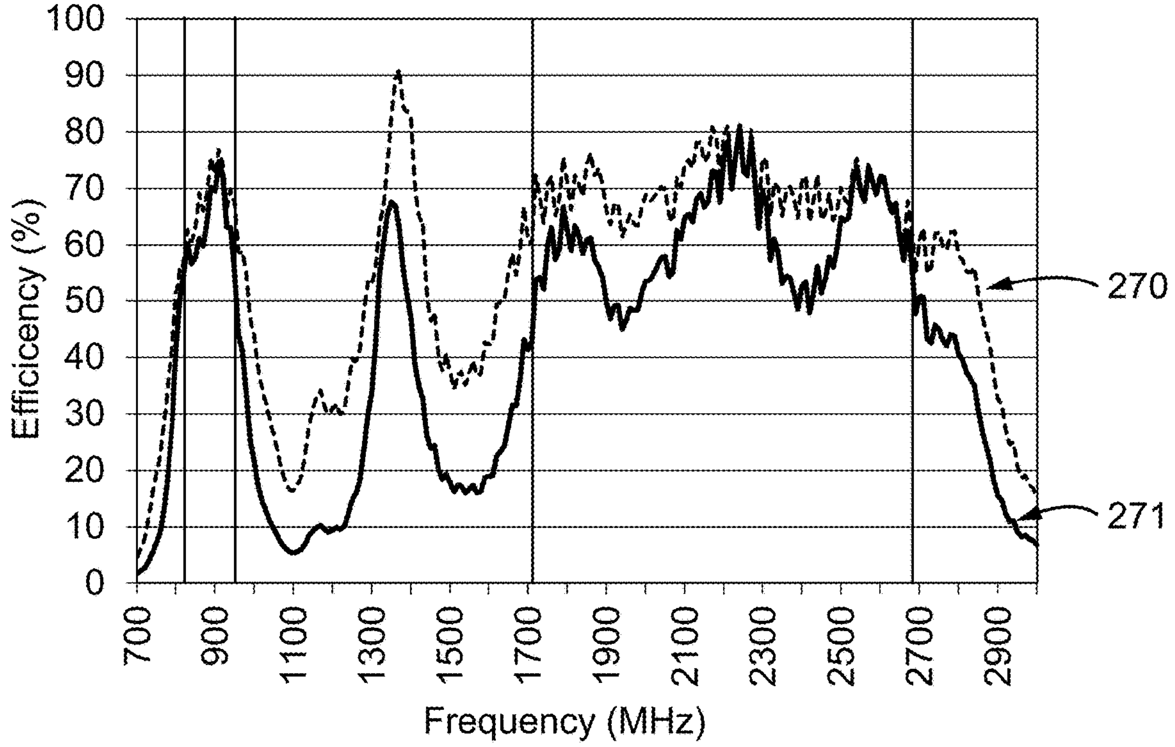

FIGS. 7A-7C show different graphs in which radiation and antenna efficiencies of a device in free-space conditions, a device in close proximity to an electrically conductive body and a device in accordance with an embodiment are compared.

In FIG. 7A is shown the radiation and antenna efficiencies 250, 251 (shown with dashed and solid lines, respectively) of a device such as the device 5 of FIGS. 1A-1B in free-space conditions, that is to say, not in close proximity to the electrically conductive body 50 and without any electrically conductive elements connected thereto. The device features a radiation efficiency 250 ranging from 70% up to 85% and an antenna efficiency 251 ranging from 55% up to 80% in the 824 MHz to 960 MHz band whereas, whereas the radiation efficiency 250 ranges from 75% up to 90% and the antenna efficiency 251 ranges from 65% up to 85% in the 1710 MHz to 2690 MHz band.

In FIG. 7B, there is shown the radiation and antenna efficiencies in the lower frequency band of the same device when it is in close proximity to the electrically conductive body, particularly when provided with connecting points and electrically conductive elements connecting it to the electrically conductive body and when it is not provided with such connecting points and electrically conductive elements. In the latter case, the radiation efficiency 260 (shown with a dashed line) ranges from 18% up to 60% and the antenna efficiency 261 (shown with a solid line) ranges from 10% up to 24% in the 824 MHz to 960 MHz band, whereas in the former case the radiation efficiency 265 (shown with a dashed line with dashes shorter than those of the dashed line of the radiation efficiency 260) ranges from 50% up to 75% and the antenna efficiency 266 (shown with a dotted line) ranges from 40% up to 73% in the same band. In this particular example, there is an improvement of up to 6 dB in radiation efficiency 265 (an improvement over 1:4) at frequencies in the band up to around 900 MHz, raising the efficiency from around 10-15% to over 60% at the lower frequencies of the band, for instance at 824 MHz; at higher frequencies in the band, the improvement is smaller. In this example, the efficiency at the higher frequency band (1710 MHz to 2690 MHz) is preserved compared to a free-space case, i.e. in absence of a conductive body, this is because the device and the electrically conductive body are not proximate in terms of the free-space wavelength at said frequencies. In some examples, the efficiency of the radiating system is improved in the same bands of operation or in other part(s) of the electromagnetic spectrum where the improve in efficiency enables the use of further bandwidth(s); for example the efficiency may be improved 0.5 dB or more, such as 1 dB, 2 dB, 3 dB, 6 dB or even more. This is illustrated in FIG. 7C, where the radiation and antenna efficiencies 270, 271 (shown with dashed and solid lines, respectively) of the device 5 of FIGS. 1A-1B are shown. In comparison with the free-space case of FIG. 7A, the radiating system has improved both the radiation and antenna efficiency 270, 271 in a frequency range at about 1400 MHz, thereby enabling the radiating system to operate in one more band of operation.

FIG. 8 shows an exemplary matching network 80 that is to be installed in the pads of the printed circuit board 10 corresponding to the location of the matching network 30 of the device 5.

The matching network 80 is connected to the at least one radiation booster 11 of the device 5 of FIGS. 1A-1B from one side, and to the at least one external port 32 from the other side. The matching network 80 comprises: a first inductor 81 with an inductance of 4.3 nH: a second inductor 82 with an inductance of 18 nH; a first capacitor 83 with a capacitance of 0.9 pF; a second capacitor 84 and a third inductor 85 with a capacitance of 1.0 pF and an inductance of 13 nH, respectively; a third capacitor with a capacitance of 2.0 pF; and a fourth inductor with an inductance of 4.5 nH.

It is readily apparent that, in other embodiments, different matching networks are possible within the scope of the present disclosure.

Figure 9:
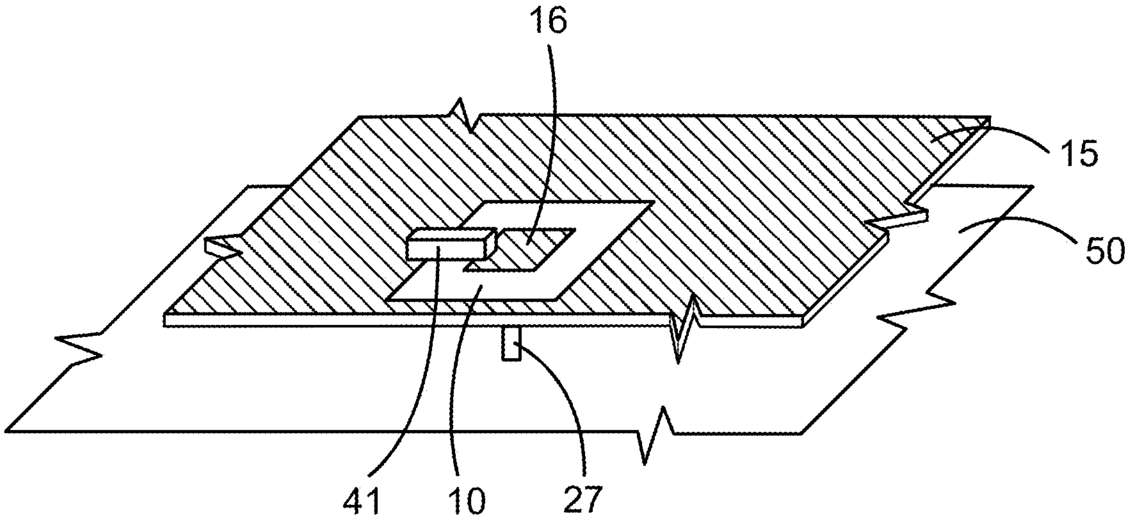
FIG. 9 diagrammatically shows an exemplary arrangement of an electrically conductive element in accordance with the present disclosure.

FIG. 9 diagrammatically shows an exemplary arrangement of an electrically conductive element in accordance with the present disclosure. In FIG. 9 there is partially represented a device with a printed circuit board 10, which comprises a ground plane layer 15 that is in close proximity (in terms of the operating free-space wavelength) to an electrically conductive body 50 of an apparatus (partially represented in FIG. 9 for the sake of clarity only).

An electrically conductive element for connecting a connecting point of the ground plane layer 15 to the electrically conductive body 50 comprises first and second components 41, 27. The first component 41 is an inductor, which is arranged on a same plane of the ground plane layer 15 such that a first terminal thereof is connected to the connecting point and a second terminal thereof is connected to a soldering pad 16. The second component 27 is a wire-made via having a first terminal thereof connected to the soldering pad 16 and a second terminal thereof connected to the electrically conductive body 50. The first and the second components 41, 27 are arranged in series and adapted to alter the electric currents flowing in the electrically conductive body 50. In other embodiments, other components are provided in the electrically conductive element and may be arranged differently, for example connected in shunt and/or not coplanar with the ground plane layer 15.

In some other embodiments, one or more components are provided in the electrically conductive body 50, said one or more components being electrically connected to the ground plane of the electrically conductive body 50. The electrically conductive element is thus formed by both the component or components in the device and the one or more components in the electrically conductive body 50. The component or components of the device establish the electrical connection between the ground plane layer 15 thereof and the ground plane layer of the electrically conductive body 50, the electrical connection being established through the one or more components in the electrically conductive body 50.

Figure 10:
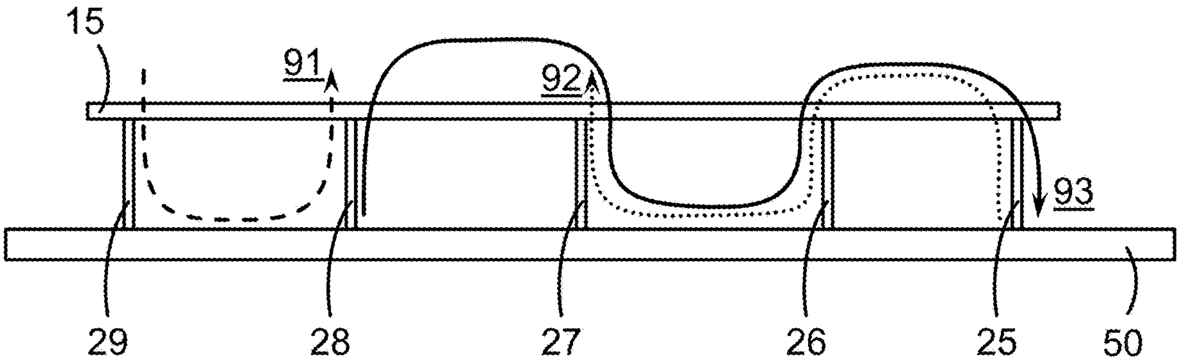
FIG. 10 diagrammatically shows exemplary paths followed by electric currents in a device in accordance with an embodiment.

FIG. 10 diagrammatically shows exemplary paths followed by electric currents in a device in accordance with an embodiment of the present invention.

A side view of a device is represented in which only the ground plane layer 15 and five electrically conductive elements 25-29 are shown for the sake of clarity. The electrically conductive elements 25-29 connect five different connecting points of the ground plane layer to an electrically conductive body 50 of an apparatus.

Depending on the distribution of the connecting points and the components of the electrically conductive elements 25-29, the different connections between the ground plane layer 15 and the electrically conductive body 50 are established for different ranges of frequencies, thereby providing different paths for the electric currents flowing therein. For example, shown with a dashed line is a first path 91 followed by electric currents of a first wavelength or frequency; the first path 91 goes through two different connections of the electrically conductive elements 28, 29. Further, shown with a dashed line is a second path 92 followed by electric currents of a second wavelength or frequency; the second path 92 goes through three different connections of the electrically conductive elements 25-27 and has a length longer than the first path 91. Also, shown with a solid line is a third path 93 followed by electric currents of a third wavelength or frequency; the third path 93 goes through four different connections of the electrically conductive elements 25-28 and has a length longer than the second path 92.

By adjusting how the induced electric currents flowing on the conductive body are altered and the paths followed by electric currents of different frequencies or wavelengths, the radioelectric performance of the radiating system is improved, not only in terms of reducing the decrease of performance owing to the close proximity of the electrically conductive body 50 but also in terms of further bandwidth provided, such an improvement evidenced by an increase in efficiency in one or more bands.

The behavior of the device of the embodiment of FIG. 10 is also applicable to devices in accordance with other embodiments in which the ground plane layer has two or more connecting points. There is a greater flexibility in the configuration of the different paths for electric currents of different frequencies or wavelengths as more connecting points are provided; in this sense, devices in which the ground plane layer has four or more connecting points are more suitable for providing different paths for the electric currents and, thus, improve even further the bandwidth of operation of the radiating system.

Figure 11A:
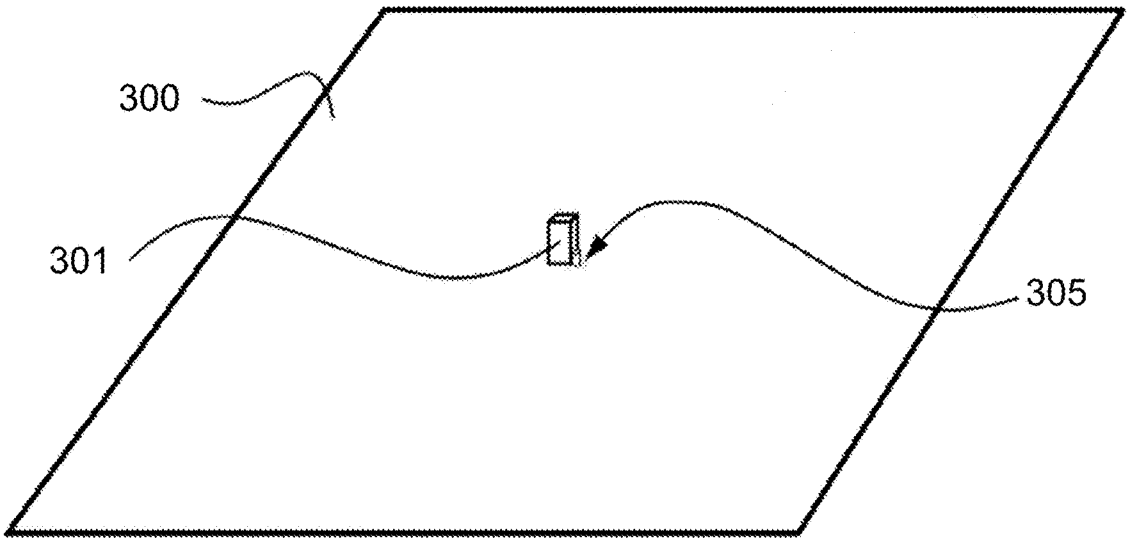
FIGS. 11A-11B diagrammatically show a test platform for the electromagnetic characterization of radiation booster elements.

FIG. 11A diagrammatically shows, in a 3D perspective, a test platform for the characterization of radiation booster elements.

Radiation booster elements such as the radiation booster element 301 of the device 5 have an electromagnetic behavior that may be characterized by means of a test platform for electromagnetically characterizing radiation boosters, as described in lines 9-34 of page 20 of said document. Said platform comprises a substantially square conductive surface 300 on top of which, and substantially close to the central point, the element to be characterized is mounted perpendicular to said surface in a monopole configuration, said conductive surface acting as the ground plane. The substantially square conductive surface 300 comprises sides with a dimension larger than a reference operating wavelength. In the context of the present invention, said reference operating wavelength is the free-space wavelength equivalent to a frequency of 900 MHz. A substantially square conductive surface according to the present invention is made of copper with sides measuring 60 centimeters, and a thickness of 0.5 millimeters.

In the test configuration as set forth above, a radiation booster element 11 may be characterized by a ratio between the first resonance frequency and the reference frequency (900 MHz) being larger than a minimum ratio of 3.0. In some cases, said ratio may be even larger than a minimum ratio such as any one of the following values: 3.4, 3.8, 4.0, 4.2, 4.4, 4.6, 4.8, 5.0, 5.2, 5.4, 5.6, 5.8, 6.0, 6.2, 6.6 or 7.0.

A radiation booster element 11 may also be characterized by a radiation efficiency measured in said platform, at a frequency equal to 900 MHz, being less than 50%, preferably being less than 40%, 30%, 20%, or 10%, and in some cases being less than 7.5%, 5%, or 2.5%. All those are quite remarkably low efficiency values.

The platform comprises the substantially square conductive surface 300 and a connector 305 (for instance an SMA connector) electrically connected to the device or element 301 to be characterized. The conductive surface 300 has sides with a length greater than the reference operating wavelength corresponding to the reference frequency. For instance, at 900 MHz, said sides are at least 60 centimeters long. The conductive surface may be a sheet or plate made of copper, for example. The connector 305 is placed substantially in the center of conductive surface 300.

Figure 11B:
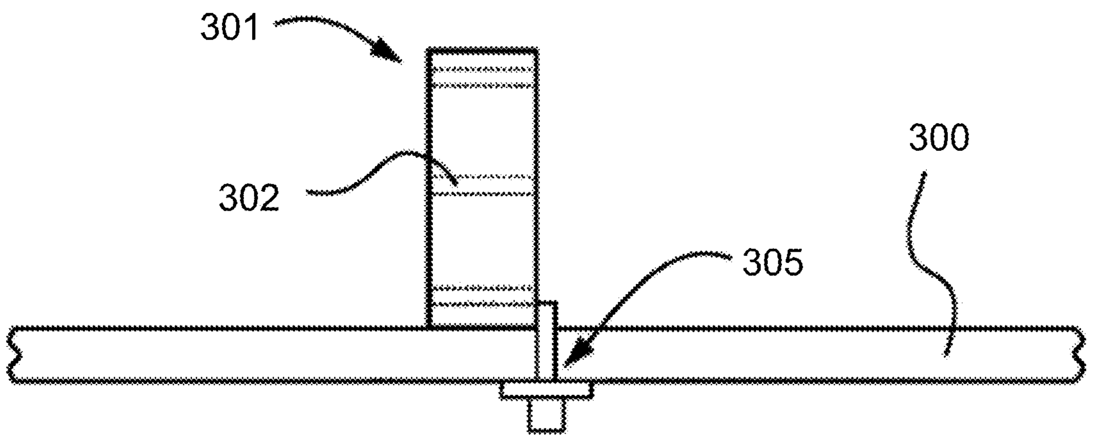

In FIG. 11B the same test platform is diagrammatically represented in a 2D perspective wherein the conductive surface 300 is partially drawn. In this example, the element that is to be characterized is a radiating booster element 301, which is arranged so that its largest dimension is perpendicular to the conductive surface 300, and one of the first or second conductive surfaces of the radiating booster element 301 is in direct electrical contact with the connector 305 (for clearer interpretation of the orientation of the radiation booster element 301, via holes 302 connecting the first and second conductive surfaces of the radiation booster element 301 are also drawn in FIG. 11B). The radiation booster element 301 lies on a dielectric material (not shown) attached to the conductive surface 300 so as to minimize the distance between radiation booster element 301 and the surface 300. Said dielectric material may be a dielectric tape or coating, for example.

Figure 12:
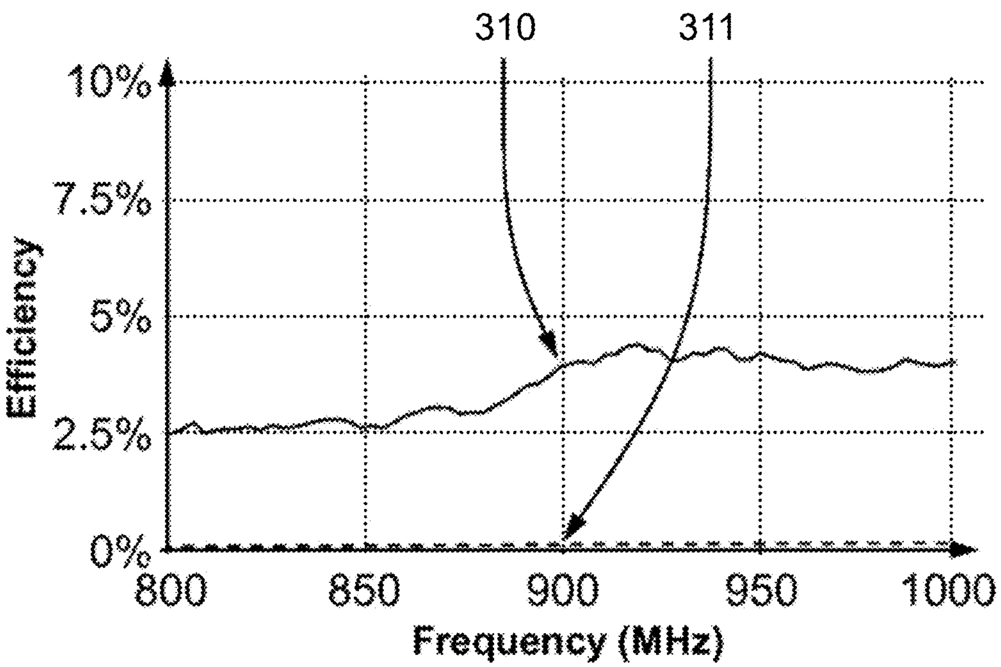
FIG. 12 shows a graph with the radiation efficiency and antenna efficiency of a radiation booster element measured with the test platform of FIGS. 11A-11B.

FIG. 12 shows a graph of the radiation efficiency and antenna efficiency measured in a test platform like the one shown in FIGS. 11A-11B, when the element 301 to be characterized is a radiation booster element 301. In this particular example, the radiation efficiency measured 310 (shown with a solid line) at 900 MHz is less than 5%, and the antenna efficiency measured 311 (shown with a dashed line) at 900 MHz is less than 1%.

Even though the terms first, second, third, etc. have been used herein to describe several devices, elements or magnitudes, it will be understood that the devices, elements or magnitudes should not be limited by these terms since the terms are only used to distinguish one device, element or magnitude from another. For example, the first connecting point could as well be named second connecting point and the second connecting point could be named first connecting point without departing from the scope of this disclosure.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

What is claimed is:

1. A system, comprising:
- a device including a radiating system, the radiating system comprising:
  - a radiation booster or a radiating element;
  - a ground plane layer having a first connecting point and a second connecting point;
  - a radiofrequency system electrically connected to the radiation booster or the radiating element and comprising a matching network; and
  - an external port electrically connected to the radiofrequency system;
- an apparatus comprising an electrically conductive body, wherein:
  - the ground plane layer is spaced from the electrically conductive body by a distance less than λ/10, λ being a free-space wavelength at a lowest frequency of operation of the radiating system;
  - a width of the electrically conductive body is greater than a width of the ground plane layer and less than 100 times the width of the ground plane layer;
  - a length of the electrically conductive body is greater than a length of the ground plane layer and smaller than 100 times the length of the ground plane layer; and
  - the electrically conductive body is not part of a printed circuit board;
- a first electrically conductive element comprising one or more components arranged to electrically connect the first connecting point of the device to the electrically conductive body; and
- a second electrically conductive element comprising one or more components arranged to electrically connect the second connecting point of the device to the electrically conductive body.

2. The system of claim 1, wherein the distance between the ground plane layer and the electrically conductive body is less than λ/15.

3. The system of claim 1, wherein the distance between the ground plane layer and the electrically conductive body is less than λ/20.

4. The system of claim 1, wherein the distance between the ground plane layer and the electrically conductive body is less than λ/30.

5. The system of claim 1, wherein the ground plane layer and the electrically conductive body have respective surfaces which, in plan view, overlap such that a projection of at least part of the ground plane layer onto the electrically conductive body intersects the electrically conductive body.

6. The system of claim 1, wherein:
- the first electrically conductive element comprises a single component, the single component being a via extending between the ground plane layer and the electrically conductive body; and
- the second electrically conductive element comprises a reactive component selected from a switch, a capacitor, an inductor, a resistor, a filter, or any combination thereof, in series or in shunt with a conductive path between the second connecting point and the electrically conductive body.

7. The system of claim 1, wherein at least one of the first and second electrically conductive elements comprises:
- a first component on a printed circuit board that provides the ground plane layer, the first component being electrically connected in series between the first connecting point and the electrically conductive body; and
- a second component provided on or within the electrically conductive body, the second component being electrically connected in series between the second connecting point and the electrically conductive body.

8. The system of claim 1, wherein the radiation booster has a maximum physical dimension that is smaller than one fifteenth of the free-space wavelength at the lowest frequency of operation of the radiating system.

9. The system of claim 1, wherein the device is a wireless device and the radiating system is matched by the matching network to operate in at least one of:
- a first frequency band extending from about 698 MHz to 960 MHz; and
- a second frequency band extending from about 1710 MHz to 2690 MHz.

10. The system of claim 1, wherein the first electrically conductive element comprises a switch or a resistor arranged such that alternative electrical connection configurations between the first connecting point and the electrically conductive body are obtainable by changing a state or presence of the switch or the resistor.

11. The system of claim 1, wherein:
- the first and second electrically conductive elements and the first and second connecting points define two different closed-loop electric current paths having different electrical lengths; and
- electric currents induced on a surface of the electrically conductive body by operation of the radiating system are such that at least some of the electric currents on the surface of the electrically conductive body are substantially in-phase with at least some electric currents induced in the ground plane layer by the radiation booster or the radiating element.

12. A system, comprising:
- a device including a radiating system, the radiating system comprising:
  - a radiation booster or a radiating element;
  - a ground plane layer having at least three connecting points spaced apart along a lengthwise dimension of the ground plane layer, including a first connecting point, a second connecting point, and a third connecting point;

a radiofrequency system electrically connected to the radiation booster or the radiating element and comprising a matching network; and an external port electrically connected to the radiofrequency system;

an apparatus comprising an electrically conductive body, wherein the ground plane layer is spaced from the electrically conductive body by a distance less than λ/10, λ being a free-space wavelength at a lowest frequency of operation of the radiating system;

a first electrically conductive element comprising one or more components arranged to electrically connect the first connecting point of the device to the electrically conductive body; and a second electrically conductive element comprising one or more components arranged to electrically connect the second connecting point of the device to the electrically conductive body.

13. The system of claim 12, wherein:

the first connecting point is arranged within a first third of the ground plane layer in the lengthwise dimension;

the second connecting point is arranged within a second third of the ground plane layer in the lengthwise dimension; and the third connecting point is arranged within a third third of the ground plane layer in the lengthwise dimension.

14. The system of claim 13, wherein distances along the lengthwise dimension between adjacent ones of the first, second, and third connecting points are each between 5L/12 and 7L/12, L being a length of the ground plane layer.

15. The system of claim 12, wherein the ground plane layer comprises at least a fourth connecting point, and the system further comprises at least one additional electrically conductive element electrically connected between the fourth connecting point and the electrically conductive body.

16. The system of claim 15, wherein the first, second, third, and fourth connecting points are located substantially along a same width-wise line of the ground plane layer at a same distance from a longitudinal edge of the ground plane layer.

17. A system, comprising:

a device including a radiating system, the radiating system comprising:

a radiation booster or a radiating element, wherein the radiation booster or the radiating element, in a mounted configuration on a test platform comprising a conductive plate of predetermined size and fed at a frequency of 900 MHz, exhibits:

a first resonance frequency whose ratio to 900 MHz is greater than 3.0; and/or a radiation efficiency at 900 MHz that is less than 50%;

a ground plane layer having a first connecting point and a second connecting point;

a radiofrequency system electrically connected to the radiation booster or the radiating element and comprising a matching network; and an external port electrically connected to the radiofrequency system;

an apparatus comprising an electrically conductive body, wherein the ground plane layer is spaced from the electrically conductive body by a distance less than λ/10, λ being a free-space wavelength at a lowest frequency of operation of the radiating system;

a first electrically conductive element comprising one or more components arranged to electrically connect the first connecting point of the device to the electrically conductive body; and a second electrically conductive element comprising one or more components arranged to electrically connect the second connecting point of the device to the electrically conductive body.

* * * * *